(12) United States Patent
Battlogg (10) Patent No.: US 11,934,597 B2
(45) Date of Patent: Mar. 19, 2024

(54) METHOD FOR OPERATING AN INPUT DEVICE FOR A COMPUTER DEVICE, AND INPUT DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 0 days.

(21) Appl. No.: 17/787,651

(22) PCT Filed: Dec. 18, 2020

(86) PCT No.: PCT/EP2020/087230
§ 371 (c)(1),
(2) Date: Jun. 21, 2022

(87) PCT Pub. No.: WO2021/123313
PCT Pub. Date: Jun. 24, 2021

(65) Prior Publication Data
US 2022/0413627 A1 Dec. 29, 2022

(30) Foreign Application Priority Data
Dec. 18, 2019 (DE) ............... 10 2019 135 032.8

(51) Int. Cl.
*G06F 3/038* (2013.01)
*F16D 5/00* (2006.01)
(Continued)

(52) U.S. Cl.
CPC ............ *G06F 3/038* (2013.01); *F16D 57/002* (2013.01); *G05G 5/03* (2013.01); *G05G 5/12* (2013.01);
(Continued)

(58) Field of Classification Search
CPC .... G06F 3/038; G06F 3/03543; G06F 3/0362; G06F 3/0482; G06F 2203/013;
(Continued)

(56) References Cited

U.S. PATENT DOCUMENTS 10,976,827 B2 4/2021 Battlogg
10,996,770 B2 * 5/2021 McLoughlin ........... G06F 3/038
(Continued)

FOREIGN PATENT DOCUMENTS

DE 102017131031 A1 6/2018
WO 9949443 A2 9/1999
(Continued)

*Primary Examiner* — Ariel A Balaoing
(74) *Attorney, Agent, or Firm* — Laurence A. Greenberg; Werner H. Stemer; Ralph E. Locher (57) ABSTRACT

A method for operating an input device. An input element of the input device is manually operated to perform an input into a computer device operatively connected to the input device. Mobility of the input element can be selectively delayed, blocked, and enabled by a controllable magnetorheological braking device. The mobility of the input element is selectively adjusted by the computer device at least as a function of at least one input condition stored in the computer device. The input device may be a computer mouse.

18 Claims, 2 Drawing Sheets

(51) Int. Cl.
*F16D 57/00* (2006.01)
*G05G 5/03* (2008.04)
*G05G 5/12* (2006.01)
*G06F 3/01* (2006.01)
*G06F 3/0354* (2013.01)
*G06F 3/0362* (2013.01)
*G06F 3/0482* (2013.01)

(52) U.S. Cl.
CPC .......... *G06F 3/016* (2013.01); *G06F 3/03543* (2013.01); *G06F 3/0362* (2013.01); *G06F 3/0482* (2013.01); *G05G 2505/00* (2013.01); *G06F 2203/013* (2013.01); *G06F 2203/04806* (2013.01)

(58) Field of Classification Search
CPC ........ G06F 2203/04806; F16D 57/002; G05G 5/03; G05G 5/12; G05G 2505/00
See application file for complete search history.

(56) References Cited

U.S. PATENT DOCUMENTS

| | | | |
|---|---|---|---|
| 11,048,344 B1* | 6/2021 | Drezet | ...................... H01F 7/20 |
| 11,231,780 B2 | 1/2022 | Battlogg | |
| 2002/0054011 A1* | 5/2002 | Bruneau | ............. G06F 3/03543 |
| | | | 345/156 |
| 2002/0054060 A1* | 5/2002 | Schena | ............... G06F 3/03543 |
| | | | 715/701 |
| 2002/0057152 A1* | 5/2002 | Elferich | .................... G05G 5/03 |
| | | | 335/220 |
| 2002/0109668 A1* | 8/2002 | Rosenberg | ............. G06F 3/016 |
| | | | 345/156 |
| 2004/0108992 A1* | 6/2004 | Rosenberg | .......... G06F 3/03543 |
| | | | 345/156 |
| 2005/0156892 A1* | 7/2005 | Grant | ...................... G06F 3/016 |
| | | | 345/167 |
| 2007/0146324 A1* | 6/2007 | Blandin | ................ G06F 3/0362 |
| | | | 345/163 |
| 2007/0279401 A1 | 12/2007 | Ramstein et al. | |
| 2015/0149899 A1* | 5/2015 | Bernstein | ............. G06F 3/0414 |
| | | | 715/702 |
| 2018/0166235 A1* | 6/2018 | Merminod | ................ G06F 3/02 |
| 2020/0226872 A1* | 7/2020 | Russ | ................... G07F 17/3209 |
| 2021/0286448 A1* | 9/2021 | Dunant | ................ G06F 3/0482 |

FOREIGN PATENT DOCUMENTS

| | | |
|---|---|---|
| WO | 0191100 A1 | 11/2001 |
| WO | 2017001697 A1 | 1/2017 |
| WO | 2018215350 A1 | 11/2018 |

\* cited by examiner

METHOD FOR OPERATING AN INPUT DEVICE FOR A COMPUTER DEVICE, AND INPUT DEVICE

FIELD AND BACKGROUND OF THE INVENTION

The present invention relates to a method for operating an input device, in particular a computer mouse, for a computing apparatus, and to such an input device. At least one input element of the input device is at least partially manually actuated in order to perform an input into the computing apparatus, which is operatively connected to the input device.

SUMMARY OF THE INVENTION

Such input devices are widely used for example in the form of computer mice. In contrast thereto, the object of the present invention is to improve the operability of the input device. The intention is in particular to improve operating comfort and/or ergonomics and to support the user better when working with the input device. The use of the input device and the performing of inputs is preferably intended to be made more intuitive.

This object is achieved by a method having the features of the claims and by an input device having the features of the claims. Preferred developments of the invention are the subject of the dependent claims. Further advantages and features of the present invention will become apparent from the general description and the description of the exemplary embodiments.

The method according to the invention is used to operate an input device for a computing apparatus. At least one input element of the input device is at least partially manually actuated in order to perform an input into the computing apparatus, which is operatively connected to the input device. At least one mobility of the input element is able to be delayed (that is to say braked and in particular damped) and/or blocked and/or enabled in a targeted manner by way of at least one controllable magnetorheological braking apparatus. In this case, the mobility of the input element is adjusted in a targeted manner in particular by way of at least one control apparatus and/or by the computing apparatus at least on the basis of at least one input condition stored in the computing apparatus and/or in the input device. The mobility of the input element is in particular adjusted by way of driving the braking apparatus.

The method according to the invention offers a large number of advantages. The adjustment of the mobility of the input element on the basis of the input condition is particularly advantageous. The user is thereby able to be supported in a targeted manner when working with the input device. The use of the input device additionally becomes considerably more comfortable and the performing of inputs is made more intuitive. For example, it is thus possible to achieve an improvement in productivity and a reduction in the frequency of errors made by the user.

The method is in particular used to operate a computer mouse. The method may also be used to operate a rotary knob and/or a scrolling wheel and/or a thumbwheel and/or a joystick and/or another input device.

The computing apparatus may be a computer or a mobile terminal. The computing apparatus may also be part of another device or of a machine or of a vehicle. For example, the input device is then a thumbwheel in the steering wheel of a vehicle. The computing apparatus in particular comprises at least one display apparatus. The input device in particular provides a human-machine interface (HMI) or is part thereof. The computing apparatus in particular comprises at least one graphical user interface (GUI) and for example a monitor or a display or the like. Information and for example a performed input or the effects of a performed input are in particular displayed graphically on the graphical user interface.

The input condition stored in the computing apparatus may be stored fixedly. The input condition stored in the computing apparatus may also be determined dynamically, for example on the basis of a program or menu. The input condition may also be adjusted dynamically on the basis of the input, so as to give mutual feedback or dependency.

There is preferably bidirectional communication between the computing apparatus and the input device. The input device is in particular able to be driven by the computing apparatus and preferably vice versa. The computing apparatus may in particular drive the braking apparatus and preferably set the braking effect. To this end, at least one algorithm and for example software or a driver or the like is in particular stored in the computing apparatus.

Manual actuation of the input device is in particular understood to mean any actuation at least partially brought about by muscle strength. Provision may also be made in this case for operation using a foot or using a head.

In the context of the present invention, a delay is in particular understood to mean braking and particularly preferably also damping. Enabling or enablement is in particular understood to mean an at least partial reduction of the delay and in particular removal of the delay. In the case of complete enabling of the mobility of the input element, the braking apparatus is in particular inactive. In the case of enabling, a magnetorheological medium is preferably not influenced by a magnetic field actively generated by the braking apparatus. In the case of complete enabling, the input element is in particular freely movable and for example freely rotatable. In addition to a rotational movement, pressure actuation and/or pulling actuation may also be provided for the input element.

In the case of mousing over program elements (also known as mouseover), the mobility of the input element is preferably set on the basis of a type of the moused-over program element and/or on the basis of an input condition for the moused-over program element.

In one advantageous refinement, the input element is used for scrolling. In this case, the mobility of the input element is preferably set on the basis of the respectively currently displayed page information and/or other displayed information. The scrolling is in particular performed by way of a rotary movement of the input element. The input element is preferably in this case designed as an input wheel. The input wheel is in particular a finger wheel or thumbwheel or comprises at least one thereof.

The mobility of the input element is in particular delayed (in particular damped) or blocked when the currently displayed page information comprises a previously set marker and/or a desired search term and/or a user instruction. The user instruction may for example comprise an input request and/or a warning or the like.

In one advantageous refinement, the input element is used for spreadsheets. In this case, the mobility of the input element is preferably set on the basis of at least one parameter of the cells of the table, preferably the content of the cells. The parameter may also concern the position of the cells in the table.

The mobility of the input element when scrolling through a table is in particular delayed and enabled on the basis of a displayed cell height and/or cell width and/or an actual cell height and/or cell width. Provision is made in this case for an incrementation corresponding to the cell height and/or cell width to be set for the scrolling. The rotary movement of the input element is in particular incremented. In all refinements, the incrementation takes place in particular through magnetorheological generation of stopping points. The incrementation in particular takes place through targeted delaying or blocking and targeted enabling of the movement in particular time intervals and/or in particular angles of rotation.

It is preferable and advantageous for the mobility of the input element to be set on the basis of an activity of a program running in the background and/or on the basis of an operating state of an operating system of the computing apparatus. By way of example, the mobility may be delayed or blocked when the program in the background and/or the operating system output a user instruction and for example an input request and/or a warning.

It is also advantageous and preferable for the mobility of the input element to be set on the basis of a zoom procedure. In particular, a different delay is set for zooming in than for zooming out. By way of example, there is a greater delay for zooming in than for zooming out or vice versa.

In one particularly advantageous and preferred refinement, the input element is used in a construction program. It is preferable in this case for the mobility of the input element to be set on the basis of a size and/or a priority of a component that is machined and for example moved by way of the input device.

It is possible and advantageous, in the case of an input into at least one input menu containing inactive and active input fields, for the mobility of the input element to be set on the basis of whether the input field is inactive or active. By way of example, the mobility is blocked or at least partially delayed in the case of inactive input fields.

It is possible and preferable for the mobility of the input element to be changed in a targeted manner in order to provide haptic confirmation of an input performed beforehand. Such confirmation or such feedback may take place far more smoothly and in a more targeted manner using the invention than for example using a mechanically incremented mouse. In addition, a large number of different confirmations may take place using the invention through appropriate adjustment of the mobility. By way of example, confirmation is performed through vibration and/or rattling of the input element.

According to the invention, rattling is understood in particular to mean alternately blocking and enabling the mobility of the input element during an input and/or during a movement. The blocking and enabling in this case take place at a high frequency. In the case of vibration, provision may be made for a higher frequency than in the case of rattling. By way of example, provision is made for a frequency of at least 10 Hz or at least 50 Hz or at least 100 Hz or more. Provision may be made in this case for different types of confirmation to be provided depending on the scale of the frequency.

In the event of an incorrect and/or implausible and/or critical input, the mobility of the input element is preferably delayed or blocked. Such an input may also be acknowledged with the confirmation described above, for example through vibration and/or rattling. Such refinements are particularly advantageous in the case of sensitive inputs or else in the case of medical devices. Dangerous procedures and for example critical machine movements or robot movements may thereby be prohibited or displayed haptically to the user.

In one advantageous refinement, provision is made, following an input, for the mobility of the input element to be delayed or blocked until at least one further user input has been performed. The further user input is performed in particular through an input other than the delayed or blocked mobility of the input element. By way of example, provision may be made to pull or press the input element when the rotatability is delayed or blocked. It is also possible for the further user input to be performed by way of another input device. The further user input may for example concern confirmation of a particularly important or critical input.

In one refinement that is likewise advantageous and preferred, the input device is used in gaming (computer games). It is preferable in this case for the mobility of the input element to be set on the basis of a scenario generated by way of the computing apparatus. The mobility of the input element is preferably delayed to a greater extent the higher a force to be notionally applied in the scenario and/or the more difficult an operation to be notionally performed in the scenario.

In all refinements, it is possible for the mobility and preferably an incrementation of the rotatability of the input element to be able to be adjusted through at least one user input. The adjustment that is made is preferably stored in the computing apparatus and/or in the input device. By way of example, the incrementation that is normally provided may be made coarser and/or finer. A maximum delay of the mobility may also be settable. Such an adjustment may in particular be made specifically for a respective program.

In one particularly advantageous and preferred development, the input element comprises at least one input wheel. The input wheel is in particular designed as a mouse wheel, in particular of a computer mouse. In this case, the input is preferably performed at least by rotating the input wheel. The rotatability of the input wheel may preferably be delayed, in particular damped, and blocked and released in a targeted manner by way of the braking apparatus. The input element, in particular the input wheel, preferably also has at least axial mobility. By way of example, provision may be made to press and/or pull the input element, and preferably the input wheel.

In all refinements, it is particularly preferable for the mobility of the input element to be set, or be able to be set, from freely movable to completely blocked. The rotatability of the input wheel may preferably be set from freely rotatable to completely blocked. In this case, the mobility or rotatability is completely blocked in the context of the present invention when a movement or rotation through a force able to be generated manually when using the input device as intended is not possible. The braking apparatus is in particular suitable and designed for applying a delay torque of at least 0.5 Nm and preferably of at least 2 Nm or else at least 3 Nm.

It is preferable for the mobility of the input element and in particular the rotatability of the input wheel to be changed over, or be able to be changed over, between freely rotatable and blocked at a first frequency of at least 10 Hz and preferably at least 50 Hz. A frequency of at least 20 Hz or at least 30 Hz or at least 40 Hz is also possible. Provision may also be made for a frequency of at least 60 Hz or at least 80 Hz or at least 100 Hz. Frequencies of at least 120 Hz or at least 200 Hz or more are also possible.

For the rotatability of the input wheel, at least 50 stop points and preferably at least 100 stop points for a respective revolution may in particular be set. At least 150 or at least 200 or at least 250 or at least 300 stop points are also possible. Provision may also be made for at least 350 or at least 400 stop points. The minimum angle of rotation able to be set between two stop points is in particular at most 10° and preferably at most 5° and particularly preferably at most 2°. The minimum angle of rotation able to be set between two stop points may also be at most 1° or at most 0.5° or at most 0.1°.

The number of stop points is preferably set on the basis of a number of input options provided. By way of example, the number of stop points is set on the basis of selection options, menu options and/or a number of pages or tabs or the like. In this case, a stop point is in particular provided by virtue of the rotatability of the input wheel being at least temporarily delayed in a targeted manner, and in particular blocked and then enabled again.

It is possible and advantageous for an angle of rotation between the stop points to be reduced when faster scrolling and/or a faster page change is performed. It is possible for an angle of rotation between the stop points to be increased when slower scrolling and/or a slower page change is performed. The reverse configuration is also possible.

The angle of rotation of the input wheel is in particular monitored by way of a sensor apparatus. The sensor apparatus is in particular designed and suitable for detecting the angle of rotation with a resolution of at least 1° and preferably at least 0.5° and particularly preferably at least 0.2° or else preferably at least 0.1°.

In all refinements, it is particularly preferable for the mobility of the input element to be adjusted, or be able to be adjusted, in real time. The braking apparatus is in particular designed and suitable for changing the delay by at least 30% within less than 100 milliseconds. The delay is in particular able to be changed by at least 10%, preferably by at least 30%, and particularly preferably by at least 50% within less than 10 milliseconds. The delay may also be able to be varied by at least 100% or 500% or by ten times or by a thousand times within less than 100 milliseconds. Such real-time control is a particularly great advantage for work using the input device.

It is possible for the input condition also to be dynamically adjusted on the basis of the input. It is thereby possible to adjust the mobility of the input element through the input that is performed in accordance with the feedback principle. Such mutual dependency between input and input condition achieves particularly advantageous adjustment of the rotatability and thus particularly intuitive operation of the input device.

It is possible and preferable for the control of the mobility of the input element to be designed to be trainable. By way of example, the usual habits of a user in relation to performing inputs during the operation of a program are for this purpose identified and stored in a storage apparatus. By way of example, switching elements or menu points or the like that are used commonly may be identified and stored. The user may thereby be supported when using the program again through targeted control of the mobility of the input element.

The braking apparatus is assigned in particular at least one field-sensitive magnetorheological medium and at least one field generation apparatus for generating and controlling a field strength. The field generation apparatus and the medium in this case in particular influence the mobility of the input element in a targeted manner.

The input device according to the invention is used to perform the method described above. The input device according to the invention also solves the object stated above in a particularly advantageous manner. The input device in particular for this purpose has the devices needed to perform the method. The input device in particular has at least those devices that have been set forth above in the course of the description of the method according to the invention. The input device is in particular suitable and designed for implementing the method described above by way of an algorithm stored in the input device and/or in the computing apparatus.

A braking apparatus that is particularly advantageously suitable for use with the invention is also described in patent application DE 10 2017 111 031 A1. The entire disclosure of DE 10 2017 111 031 A1 is hereby incorporated into the disclosure content of the present application. The braking apparatus has in particular at least one wedge-type bearing and at least one coil arranged axially to the axis of rotation. The coil thereby does not have to be placed next to the rollers of the wedge-type bearing, as a result of which the extent in the axial direction is able to be kept lower in the case of longer rollers. The input wheel is in particular arranged radially around the wedge-type bearing.

Further advantages and features of the present invention will become apparent from the description of the exemplary embodiments that are explained below with reference to the accompanying figures.

DETAILED DESCRIPTION OF THE INVENTION

FIGS. 1a to 1f show input devices 800 according to the invention, these being equipped with magnetorheological braking apparatuses 1 and being operated in accordance with the method according to the invention. The input devices 800 have input elements 802, here in the form of an input wheel 803.

Figure 1A:
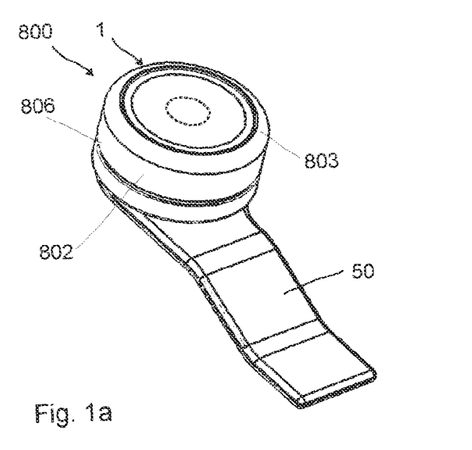
FIG. 1a-1f show purely schematic three-dimensional views of input devices according to the invention.
Figure 1B:
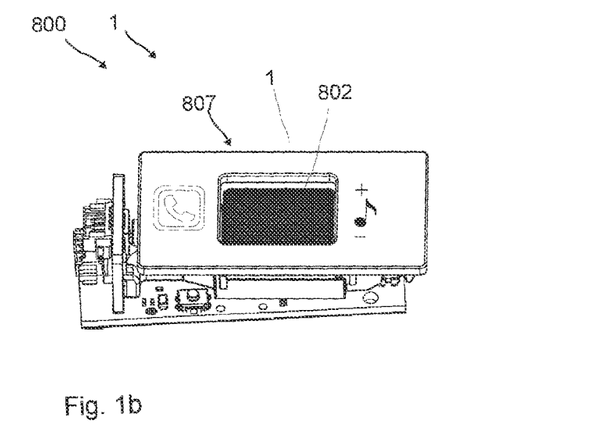
Figure 1C:
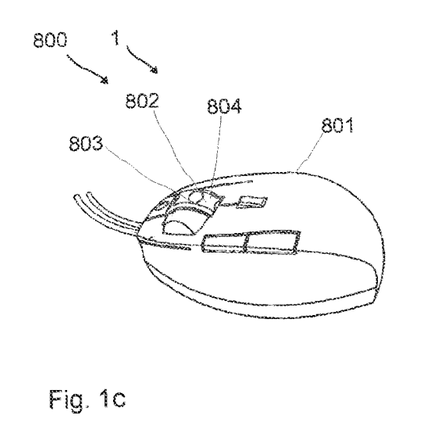
Figure 1D:
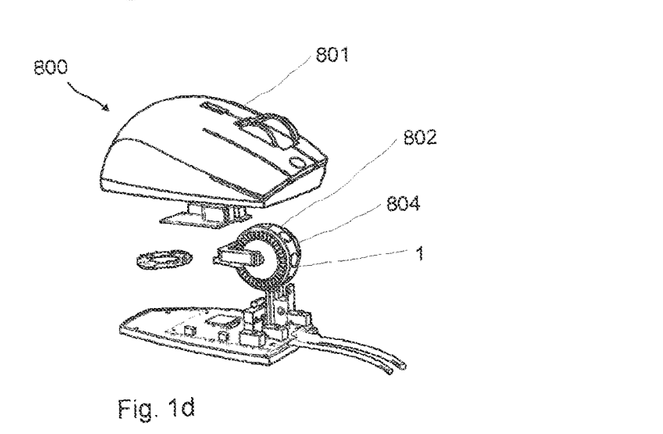
Figure 1E:
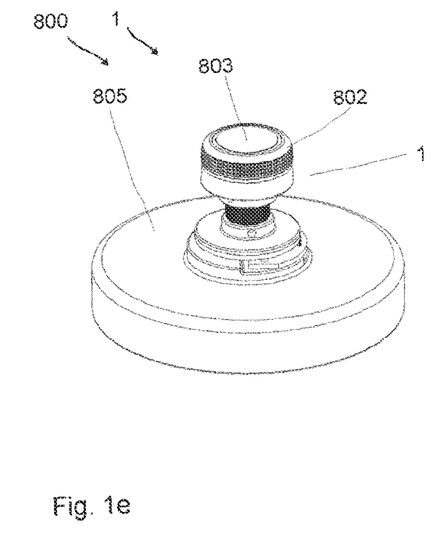
Figure 1F:
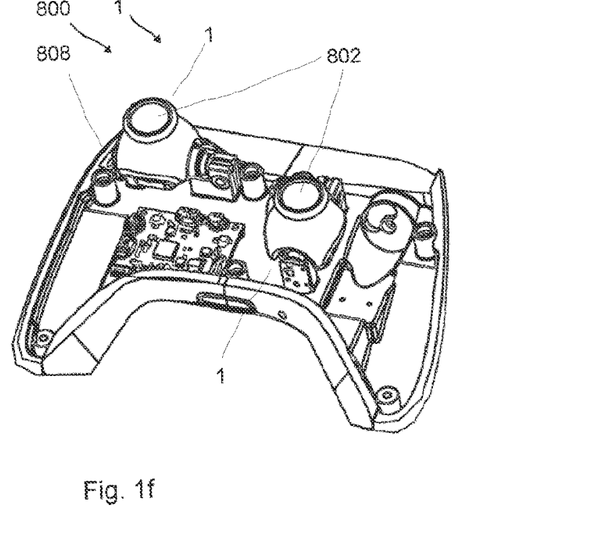

FIG. 1a shows an input device 800 in the form of a control knob 806. FIG. 1b shows an input device 800 in the form of a thumbwheel 807. FIGS. 1c and 1d show an input device 800 in the form of a computer mouse 801. In this case, the input wheel 803 is in the form of a mouse wheel 804 here. FIG. 1e shows an input device 800 in the form of a joystick 805. FIG. 1f shows an input device 800 in the form of a gamepad 808.

Figure 2:
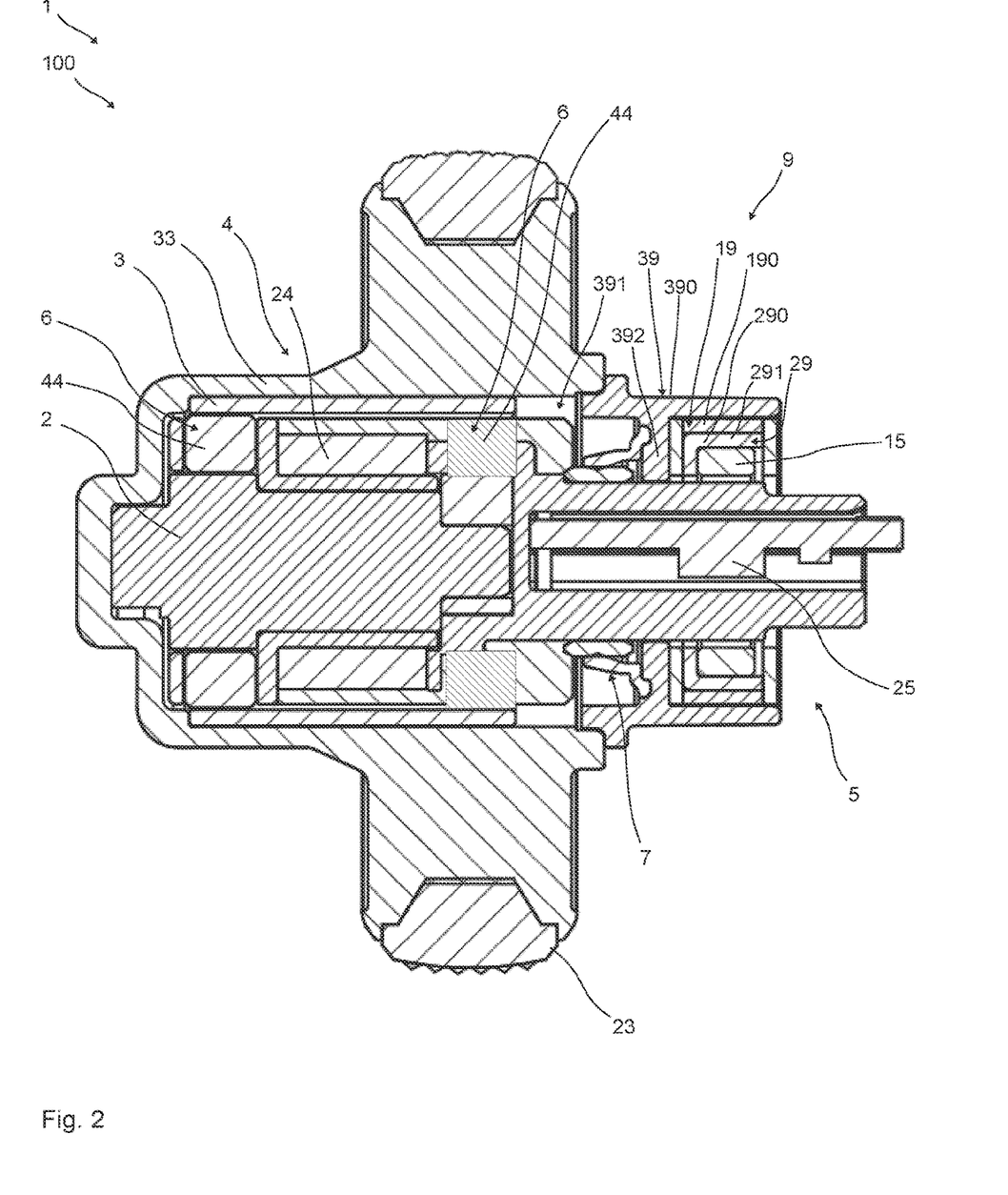
FIG. 2 shows a purely schematic illustration of a braking device in a sectional side view.

FIG. 2 shows a braking device 1 of an input apparatus 800 according to the invention having a rotary body 3 for setting operating states. The operation is thus performed here at least by rotating the rotary body 3.

The rotary body 3 is rotatably mounted on an axle unit 2 by way of a bearing apparatus 22, not shown in any more detail here. The rotary body 3 may also be rotatably mounted on an axle unit 2 by way of a wedge-type bearing apparatus 6, here in the form of a roller bearing. The wedge-type bearing apparatus 6 is preferably however not provided, or is provided only partially, for mounting the rotary body 3 on the axle unit, but rather is used for the braking apparatus 4 set forth below. The roller bodies are in this case used as braking bodies 44.

The axle unit 2 may be mounted on an object to be operated, and for example in an interior of a motor vehicle or on a medical device or smart device. To this end, the axle unit 2 may have mounting means, not illustrated in any more detail here.

Provision may be made, here or in the following refinements, for the rotary body 3 also to be able to be displaced in the longitudinal direction or along the axis of rotation on the axle unit 2. Operation then takes place both through rotation and pressing and/or pulling or displacement of the rotary button 3.

The rotary body 3 here has a sleeve-like design and comprises a cylindrical wall and an end wall connected integrally thereto. The axle unit 2 emerges on an open end face of the rotary body 3.

The finger wheel 23 may be equipped with an additional part 33, indicated here in dashed form. This brings about an increase in diameter, such that rotatability is made easier, for example in the case of a wheel, able to be rotated by a finger, of a computer mouse or gaming controller or a rotary wheel in the case of a computer keyboard thumbwheel.

The rotary movement of the rotary button 3 is damped here by a magnetorheological braking apparatus 4 arranged in a reception space 13 inside the rotary button 3. The braking apparatus 4 uses a coil unit 24 to generate a magnetic field that acts on a magnetorheological medium 34 located in the reception space 13. This leads to local and strong networking of magnetically polarizable particles in the medium 34. The braking apparatus 4 thereby allows a targeted delay and even complete blocking of the rotary movement. The braking apparatus 4 may thus be used to provide haptic feedback during the rotary movement of the rotary body 3, for example through a correspondingly perceptible incrementation or through dynamic settable stops.

In order to supply power to and drive the coil unit 24, the braking apparatus 4 here comprises an electrical connection 14, which is designed for example in the manner of a circuit board or prints or as a cable line. The connection line 11 extends here through a hole 12 running in the longitudinal direction of the axle unit 2.

The reception space 13 is sealed off externally here by a sealing apparatus 7 and a sealing unit 17 in order to prevent the medium 34 from escaping. In this case, the sealing apparatus 7 closes the open end face of the rotary body 3. For this purpose, a first sealing part 27 bears on the inside of the rotary body 3. A second sealing part 37 bears on the axle unit 2. The sealing parts 27, 37 are fastened here to a carrier structure in the form of a wall 8.

The sealing unit 17 is in the form of an O-ring here and radially surrounds the axle unit 2. The sealing unit 17 bears on the axle unit 2 and the rotary body 3. That part of the reception space 13 filled with the medium 34 is thereby sealed off from another part of the reception space 13.

In order to monitor the rotary position of the rotary body 3 so as to be able to use it to drive the braking apparatus 4, provision is made here for a sensor apparatus 5. The sensor apparatus 5 comprises a magnetic ring unit 15 and a magnetic field sensor 25.

The magnetic ring unit 15 is diametrically polarized here and has a north pole and a south pole. The magnetic field sensor 25, here in the form of a Hall sensor, measures the magnetic field emanating from the magnetic ring unit 15 and thus enables reliable determination of the angle of rotation.

The magnetic field sensor 25 is here preferably additionally of three-dimensional design, such that, in addition to rotation, an axial displacement of the rotary body 3 with respect to the axle unit 2 is also able to be measured. Both the rotation and a pushbutton function (push/pull) may thereby be measured simultaneously using the same sensor 25. The braking device 1 may however also be equipped only with a rotary function.

The sensor apparatus 5 is particularly advantageously integrated into the braking device 1. For this purpose, the sensor 25 is inserted here into the hole 12 in the axle unit 2. The magnetic ring unit 15 radially surrounds the sensor 25 and is fastened to the rotary body 3. This has the advantage that not length tolerances but rather only diameter tolerances that are to be produced accurately are relevant. The radial bearing clearance between the rotating rotary body 3 and the stationary axle unit 2 is correspondingly low and also able to be managed well in series production.

A further advantage is that axial movements or displacements between rotary body 3 and axle unit 2 do not inexpediently influence the sensor signal, since measurement is performed in the radial direction and the radial spacing is substantially decisive for the quality of the measured signal.

Another advantage is that the arrangement shown here is particularly insensitive to soiling and liquids, since the sensor is arranged internally. The sensor 25 may additionally be injection-molded in the hole 12, for example using a plastic.

The braking device 1 is equipped with a shielding apparatus 9 for shielding the sensor apparatus 5 from the magnetic field of the coil unit 24 of the braking apparatus 4. The braking device 1 shown here differs from the braking devices 1 described above, besides the shielding apparatus 9, in particular also through the design of the rotary body 3 and of the additional part 33. The braking device shown here is for example a mouse wheel of a computer mouse.

The rotary body 3 is designed here as a cylindrical sleeve and surrounded completely by the additional part 33 on its outside. In this case, the additional part 33 closes the rotary body on that radial end face remote from the magnetic ring unit 15.

The additional part 33 has a radially encircling elevation having a considerably increased diameter. The braking device 1 shown here is thereby particularly suitable as a mouse wheel of a computer mouse or the like. The elevation is designed here with a groove into which a particularly high-grip material, and for example rubber, is embedded here.

The braking device 1 shown here has two wedge-type bearing apparatuses 6 that are spaced from one another. The wedge-type bearing apparatuses 6 are each equipped with multiple braking bodies 44 arranged radially around the axle unit 2. The coil unit 24 is arranged between the wedge-type bearing apparatuses 6. The braking bodies 44 are here for example roller bodies that roll on the inside of the rotary body 3 or the outside of the axle unit 2.

The magnetic ring unit 15 is coupled to the rotary body 3 in a rotationally fixed manner such that the magnetic ring unit 15 is jointly rotated when the rotary body 3 is rotated. The magnetic field sensor 25 is inserted here into the hole 12 in the axle unit 2. The magnetic ring unit 15 radially surrounds the sensor 25 and is axially arranged at the end. The magnetic field sensor 25 is arranged here with an axial offset from the axial center of the magnetic ring unit 15. This results in particularly high-resolution and reproducible sensing of the actual position of the rotary body 3 in relation to the axle unit 2.

The shielding apparatus 9 comprises a shielding body 19, here in the form of a shielding ring 190. The shielding apparatus 9 additionally comprises a separating unit 29, which is provided here by a gap 290 filled with a filler 291.

The shielding apparatus 9 additionally comprises a magnetic decoupling apparatus 39, which is provided here by a decoupling sleeve 390 and a decoupling gap 391.

The decoupling sleeve 190 here comprises an axial wall 392 on which the sealing apparatus 7 is arranged. A bearing apparatus 22, not illustrated in any more detail here, may additionally be arranged on the axial wall 392.

The shielding body 19 is provided here with an L-shaped cross section and manufactured from a material that is particularly magnetically conductive. The shielding body 19 surrounds the magnetic ring unit 15 on its radial outside and on its axial side facing the coil unit 24. For the magnetic decoupling, the gap 290 is arranged between the shielding body 19 and the magnetic ring unit 15 and filled with a filler 291. The filler 291 in this case has a particularly low magnetic conductivity. The magnetic ring unit 15 is additionally fastened to the shielding body 19 via the filler 291.

Magnetic decoupling is achieved between the rotary body 3 and the shielding body 19 by way of the decoupling apparatus 39. For this purpose, the decoupling sleeve 390 and a filler arranged in the decoupling gap 391 likewise have a particularly low magnetic conductivity. The decoupling sleeve 391 is connected here in a rotationally fixed manner to the shielding body 19 and the additional part 33, and also the rotary body 3.

In order to be able to decouple the rotary body 3 even better from the sensor apparatus 5, the rotary body 3 is arranged here with an axial spacing from the decoupling sleeve 390. The end of the rotary body 3 facing the magnetic ring unit 15 in this case does not protrude beyond the braking body 44. The rotary body 3 is additionally axially recessed or shortened in relation to the additional part 33. This results in particularly advantageous magnetic and spatial separation of rotary body 3 and decoupling sleeve 390 in a very small installation space.

Since the magnetic field of the coil unit 24 flows through the rotary body 3 for the braking effect, such a refinement offers particularly good shielding. In order that this magnetic flux influences the sensor 25 as little as possible, the rotary body 3 is ended earlier in the axial direction and the magnetically non-conductive additional part 33 takes on the structural functions (bearing point, sealing points, etc.). The distance to the sensor 25 is thereby also greater, and the assembly becomes more lightweight as a whole.

The rotary body 3 is made from a particularly magnetically conductive material. The additional part 33 and the decoupling sleeve 390 on the other hand are made from a magnetically non-conductive material. The shielding body 19 and the rotary body 3 are here for example made from a μ-metal. The components described here as being magnetically non-conductive consist for example of plastic and have a relative magnetic permeability of less than 10.

The problematic fields that may generally interfere with the angle of rotation measurement are primarily the fields in the radial direction. These fields are shielded here by a shielding body 19, acting as a jacket, made from a suitable material, for example magnetically conductive steel. In addition, the magnetic field of the magnetic ring unit 15 may additionally be amplified. The magnetic ring unit 15 may therefore be dimensioned to be smaller (thinner), and it is thus possible to save on material, installation volumes and production costs.

The structure is also improved, according to the invention, in that the wall thickness of the shielding body 19 is varied and provision is made for a gap 290 between magnetic ring unit 15 and shielding body 19. The shielding and the amplification may be adjusted in an optimum manner by the gap 290 between ring 15 and shielding body 19. The material of the shielding body 19 is selected here such that it does not enter magnetic saturation, so that external magnetic fields are sufficiently shielded (material in saturation allows magnetic fields the same as air through, that is to say having the magnetic field constant μ0). In one advantageous design of the gap 290 between ring 15 and shielding body 19, the magnetic field does not end too greatly above the shielding body 19 and the field in the center at the sensor 25 is sufficiently homogeneous and is increased in comparison with a ring 15 of the same size or larger without the shielding body 19.

The dimensioning, shown here, of the shielding apparatus 9 is particularly well-suited for a mouse wheel of a computer mouse and has for example the following dimensions. The shielding ring 190 is 0.5 mm thick, the spacing between shielding ring 190 and ring 15 is also 0.5 mm, the width of the ring 15 is 2 mm and the diameter of the ring 15 is 8 mm. In this case, the possible interference field of the coil unit 24 is 140 μT, resulting in a possible error in the angle measurement of 0.1° (cf. Earth's magnetic field: around 48 μT in Europe).

Advantageous embodiments and applications of the method are set forth by way of example below.

The method is particularly well-suited for use in Office programs or construction applications such as for example CAD. Haptic feedback from the mouse or from the respectively used program may increase working speed, on the one hand, and help to avoid errors, on the other hand. There are many advantageous application cases in particular in the case of long lists in Excel or else long Word documents.

The mouse wheel 804 or scroll wheel briefly stops at preferred points, for example at important data, sums, at the end of lists or chapters, at headings, in Word at words marked in red (mistyped), at the end of files, etc. In the case of a search function, the cursor, during scrolling, jumps on to the next search result, and this speeds up the search for data in large lists and files. The mouse wheel 804 stops at cells that are populated with a function (programmed cells). It is thus possible to prevent programmed cells from being unintentionally deleted and populated with a number. The same applies to formatted cells. The pointer jumps to cells with the same format or remains at cells with a particular format.

In the case of slow scrolling, less browsing in the file takes place, and in the case of fast scrolling, more takes place. This is indicated by the larger incrementation when moving the mouse wheel 804. When scrolling through tables or Excel lists, the incrementation points or stop points are able to be set in a manner corresponding to the cell distance or are automatically adjusted so as to give a feel of the length of the list. A stop (blocking of the mouse wheel 804) at sums or particular important results may take place in the table.

The incrementation distance (angle of rotation between the stop points) changes depending on the position in the file. Navigation in a file may thus be made easier. By way of example, the distance of the incrementation becomes smaller close to particular positions (new section, heading, sums, end, etc.) or the mouse wheel 804 becomes more difficult to rotate and thus indicates that this region is being approached. It is thereby already known before this position is reached that it is being approached, and not just when it is reached. This is particularly suitable for visually impaired individuals.

When multiple people are working on the same file (for example in Word), haptic feedback may be used to avoid errors, since changes are no longer able to be overlooked so quickly. The mouse wheel 804 stops at changes made by another person when scrolling through the file. In the starting menu of an operating system and for example Windows, the most commonly used programs are often displayed at the top in the form of tiles. Braking may be performed in a targeted manner or to a greater extent at these programs using the adaptive mouse wheel 804.

The advantages of a computer mouse 801 with the bidirectional communication according to the invention are explained by way of example below. Error messages may be displayed haptically (through any type of feedback, for example vibration, rattling). It is possible to display events, for example new email, etc. When clicking a button/link etc., the user receives haptic feedback. This prevents multiple opening of a program when this does not open immediately or when sending an email, etc.

The invention may also be used as a learning aid, for example for new programs, tutorials and computers in general. The user receives haptic feedback when something is performed incorrectly or correctly in the tutorial. This makes it possible to become familiar with new programs. Learning is easier when receiving feedback in any form.

The computer mouse 801 may be designed to be trainable. The software observes the usual habits of the user and provides assistance when searching through incrementation or stops at commonly used interfaces, links, etc. Vibration may be provided as additional haptic response.

The bidirectional communication is also advantageous in the case of CAD programs: Easier capture through active feedback when reaching a contour etc., error display in the event of impermissible structures, for example when surfaces or contours intersect or a hole goes too deep or the like. When setting values, the input wheel 803 stops when reaching minimum and maximum values or impermissible values, etc. When zooming, the resistance is not the same when zooming in as when zooming out. A learning aid through haptic feedback is advantageous in the case of CAD as well. When moving large parts with the mouse 801, joystick 805, etc., more resistance counteracts this (increased delay), for example. The input wheel 803 is braked or else the resistance of the mouse on the surface (for example through the ball on the bottom). The size of parts may thus be sensed or experienced haptically.

The method is particularly well-suited for use in computer games or gaming. The resistance of the input element 802 and for example mouse wheel 804 or joystick 805 changes depending on the gaming situation. By way of example, when driving large vehicles, the resistance becomes greater. The input device 800 may be adapted particularly well to real systems using the method (for example joystick 805 of an aircraft in a flight simulator: different aircraft types have different resistance in the joystick 805). An additional response from the system through vibrations is possible. In the case of a football game, the resistance of the control may increase when in possession of the ball. In the case of a farming simulator, the delay of the input element 802 may change depending on the substrate, for example earth, asphalt, sand.

In the case of a racing game, it is possible to play with a steering wheel with haptic feedback. The steering wheel in this case provides the input element 802. A haptic thumbwheel may be arranged in the steering wheel, for example in order to change radio station. The control is changed depending on the substrate, in particular in the case of use with steering wheel. It is possible to change gear using thumbwheel or scroll wheel. Provision is made for a medium ripple (rattle) for example when driving on a soft substrate and a hard ripple when driving on a hard substrate and a fine ripple when scrolling or on asphalt. Complete blocking (full stop) is possible for example in the event of an accident in the game, such that the collision becomes perceptible. Such refinements are also advantageous in training programs for driving schools.

Adjusting the mobility of the input element 802 makes it possible to set a handicap for good players (gamers) in a targeted manner. Good players receive a mouse that is more difficult to handle, the haptics work against the player so that he has a disadvantage over worse players. The ability of different players may thus be adapted to one another.

The invention may also advantageously be used in motor vehicles, for example as a thumbwheel on the steering wheel or rotary pushbutton. Using haptic feedback makes it possible to set radio stations in a targeted manner or to adjust the volume. In order to reset the time, for example, there may be a small incrementation for each minute, larger delay for five minutes, even more delay for ten minutes etc.

The invention offers a particularly intuitive application for simplifying operating complexity. For example, in the event of an incoming call, the thumbwheel may first be used to accept or decline the incoming call. Rotating upward accepts, rotating downward declines or vice versa. This is displayed for example by LED-lit displays (green-accept: upward; red-decline: downward). If the user has accepted the incoming call, the volume may be adjusted during the conversation using the same thumbwheel. The operation takes place here in a particularly simple and intuitive manner. This also involves working with changeable displays, either with displays (for example OLED display) or through a color display with LEDs of various colors (red and green as known colors for on/off; etc.). The function may thus be understood easily without reading an operating manual.

The input device 800 allows gear changes with a haptic rotary button 803 or thumbwheel, setting of the driving mode (eco, eco plus, sport, etc.), setting of the cruise control system, setting of assistance systems (for example adaptive cruise control).

For a faster telephone book search, provision may be made for the starting letter for example be sought manually on the touchpad or to be input through gesture control or through voice commands. The input wheel 803 or thumbwheel is then used to rotate and there is a brief resistance upon reaching the letter or the name. This is advantageous since voice control often does not understand the correct name immediately. Gesture control or the use of a touchpad and touchscreen also often lead to incorrect letters. The correct name is reached in a very reliable manner using the input wheel 803. The search is simpler and faster with additional haptic assistance, this being particularly important in the application in vehicles in order not to be distracted from the road for long.

The invention also offers advantages in medical applications, for example when controlling robots in an operation (with a joystick). Particular inputs, for example inappropriate cuts using the scalpel, are able to be avoided through the haptic feedback and for example the blocking.

Further advantageous refinements and applications of the method are set forth by way of example below. The input wheel 83 becomes more difficult to rotate (stops) at the end of pages, at the end of the view, for maximum zooming/minimum zooming, at the end of lists, etc. It is blocked when searching for forbidden pages (for example as child safety on the Internet). The incrementation of the input wheel 803 is able to be activated and deactivated and the extent of the incrementation is able to be changed. The incrementation pitch may be set arbitrarily by the user. Folder and file sizes are indicated through more resistance during displacement. When scrolling through folders, the resistance is greater for large folders, smaller for small and individual files. Haptic feedback is highly advantageous for visually impaired individuals (when the mouse pointer is no longer seen well because it is too small). The mouse wheel 804 may change its scrolling behavior when the cursor approaches a desired (favored) point (or fixed points, at a constant distance, etc.).

In the case of entertainment media, the mouse wheel 804 may stop when fast forwarding and rewinding films, songs, etc. every five minutes, at each new scene, at the start of the next song, in playlists at commonly listened-to songs, etc. The resistance changes when changing the volume. At volume 0, the wheel stops and when an excessively high level is reached at which there is a risk to hearing, the mouse wheel 804 becomes difficult to move or is blocked. The same applies to setting screen brightness. At a preferred screen brightness, it is possible to perceive a small resistance.

As an alternative, a haptic input wheel 803 may be arranged on the keyboard so that it is possible to scroll quickly through pages and documents etc. without having to remove one's hand from the keyboard. This may be either a control knob or a scroll wheel or thumbwheel. These are controlled in particular by a wedge-type bearing with an axial coil, or by the conventional wedge-type bearing. Switching through apps with a high resistance in the case of preferred apps.

The inputting of musical notes into music typesetting programs may be made considerably easier. The wheel increments at each line of the stave. The resistance is large for low notes and becomes smaller for higher notes, such that the pitch is experienced at the mouse wheel 804 and the location on the stave is known.

In the case of drawing programs, the resistance may change when changing the settings. For example, if the line thickness is increased using the mouse wheel 804, the resistance or the delay increases in the process. Or when zooming, the resistance when magnifying the view is larger than when zooming out.

In the case of a Google search, scrolling becomes increasingly difficult when moving further away from the original search term. It is thus observed when improbable hits are found.

In the case of programming, the incrementation may adapt to the syntax of the programming language. The rotatability, for example at the start and end of a loop, is thus briefly blocked, or there is a brief resistance.

In the case of email programs, the mouse wheel 804 may be stopped or delayed at each unopened email, at emails with an attachment, at emails that have been answered, at higher-priority emails, etc.

The modes are in particular programmable such that each user is able to implement his own ideas. For this purpose, a simple app for adjusting individual haptic feedback may be implemented.

An extent of the delay of the input wheel 803 is preferably able to be set by pressing the input wheel 803. If the input wheel 803 is pressed, this opens a menu in order to be able to set the extent of the resistance.

The input wheel 803 or scroll wheel may also be used on mobile telephones or other mobile devices. For example, the volume may thus be changed on the mobile without having to look at the touchscreen. The input device 800 may also be connected externally to mobile devices and for example as a controller to a portable gaming console.

LIST OF REFERENCE SIGNS 1 braking apparatus
2 axle unit
3 rotary body
4 braking apparatus
5 sensor apparatus
6 wedge-type bearing apparatus
7 sealing apparatus
8 wall
9 shielding apparatus
11 connection line
12 hole
13 reception space
14 connection
15 magnetic ring unit
17 sealing unit
19 shielding body
21 core
22 bearing apparatus
23 finger wheel
24 coil unit
25 magnetic field sensor
27 sealing part
29 separating unit
33 additional part
34 medium
35 circuit board
37 sealing part
39 decoupling apparatus
44 braking body
45 signal line
50 console
800 input device
801 computer mouse
802 input element
803 input wheel
804 mouse wheel
805 joystick
806 control knob
807 thumbwheel
808 gamepad

The invention claimed is:

1. A method for operating an input device for a computing apparatus, the method comprising the steps of:
providing at least one input element and a controllable magnetorheological braking apparatus to the input device, the input element being operatively connected to the input device and manually actuatable to perform an input into the computing apparatus;
adjusting a mobility of the input element by selectively delaying, blocking, or enabling in a targeted manner by way the controllable magnetorheological braking apparatus based on at least one input condition stored in the computing apparatus, the at least one input condition being set based on at least one parameter of cells of a spreadsheets or the content of the cells of the spreadsheets when the input element is used for spreadsheets;
delaying the mobility of the input element based on a displayed and/or actual cell height or cell width when scrolling through a spreadsheet; and
setting an incrementation of the scrolling corresponding to the cell height and/or cell width by enabling the mobility of the input element.

2. The method according to claim 1, further comprising delaying or blocking the mobility of the input element based on an incorrect, implausible, and/or critical input.

3. The method according to claim 1, wherein the at least one input condition trainable by machine learning.

4. The method according to claim 1, further comprising:
providing the braking apparatus at least one field-sensitive rheological medium and at least one field generation apparatus for generating and controlling a field strength; and
influencing the mobility of the input element by the field generation apparatus.

5. A method for operating an input device for a computing apparatus, the method comprising the steps of:
providing at least one input element and a controllable magnetorheological braking apparatus to the input device, the input element being operatively connected to the input device and manually actuatable to perform an input into the computing apparatus;
adjusting a mobility of the input element by selectively delaying, blocking, or enabling in a targeted manner by way the controllable magnetorheological braking apparatus based on at least one input condition stored in the computing apparatus; and
selecting the mobility of the input element based on whether an input field of an input menu of the computer apparatus is inactive or active.

6. The method according to claim 5, wherein the at least one input element is a scroll wheel used for scrolling and the at least one input condition is currently displayed page information of the computing apparatus.

7. The method according to claim 5, further comprising delaying or blocking the mobility of the input element based on an incorrect, implausible, and/or critical input.

8. The method according to claim 5, further comprising:
providing the braking apparatus at least one field-sensitive rheological medium and at least one field generation apparatus for generating and controlling a field strength; and
influencing the mobility of the input element by the field generation apparatus.

9. The method according to claim 5, wherein the at least one input condition trainable by machine learning.

10. A method for operating an input device for a computing apparatus, the method comprising the steps of:
providing at least one input element and a controllable magnetorheological braking apparatus to the input device, the input element being operatively connected to the input device and manually actuatable to perform an input into the computing apparatus, and the input element having at least one input wheel, where an input is performed by rotating the input wheel, and the mobility of the input element is a rotatability of the input wheel;
adjusting a mobility of the input element by selectively delaying, blocking, or enabling in a targeted manner by way the controllable magnetorheological braking apparatus based on at least one input condition stored in the computing apparatus; and
setting stop points during a revolution of the input wheel, wherein a stop point is set by temporarily blocking and then enabling the rotatability of the input wheel and at least 50 stop points set for a respective revolution.

11. The method according to claim 10, wherein the input wheel is a mouse wheel.

12. The method according to claim 10, wherein the rotatability of the input wheel is freely rotatable when selectively enabled, and non-rotatable by a force able to be generated manually at the device when selectively blocked.

13. The method according to claim 10, further comprising alternating the rotatability of the input wheel between freely rotatable and non-rotatable at a frequency of at least 10 Hz.

14. The method according to claim 10, further comprising setting the number of stop points based on a number of input options provided.

15. The method according to claim 10, further comprising:
reducing an angle of rotation between the stop points during faster rotating of the input wheel or a faster page change input is performed; and/or
increasing an angle of rotation between the stop points during slower rotating of the input when or a slower page change input is performed.

16. The method according to claim 10, further comprising adjusting the mobility of the input element in real time.

17. The method according to claim 10, wherein the at least one input condition trainable by machine learning.

18. The method according to claim 10, further comprising:
providing the braking apparatus at least one field-sensitive rheological medium and at least one field generation apparatus for generating and controlling a field strength; and
influencing the mobility of the input element by the field generation apparatus.

* * * * *